United States Patent
Venkata et al.

(10) Patent No.: US 12,356,269 B1
(45) Date of Patent: Jul. 8, 2025

(54) SYSTEMS AND METHODS FOR DETERMINING CONNECTION METRICS FOR DEVICES IN PAIRED MODE

(71) Applicant: Meta Platforms Technologies, LLC, Menlo Park, CA (US)

(72) Inventors: Madhusudan Kinthada Venkata, South San Diego, CA (US); Fnu Yashdev, San Diego, CA (US); Abhishek Bhatnagar, South San Diego, CA (US); Shivank Nayak, Milpitas, CA (US)

(73) Assignee: Meta Platforms Technologies, LLC

( * ) Notice: Subject to any disclaimer, the term of this patent is extended or adjusted under 35 U.S.C. 154(b) by 520 days.

(21) Appl. No.: 17/884,188

(22) Filed: Aug. 9, 2022

(51) Int. Cl.
*H04L 5/00* (2006.01)
*H04W 36/30* (2009.01)

(52) U.S. Cl.
CPC .................................... *H04W 36/30* (2013.01)

(58) Field of Classification Search
CPC .................................................... H04W 36/30
USPC .......................................................... 455/436
See application file for complete search history.

(56) References Cited

U.S. PATENT DOCUMENTS

| | | | |
|---|---|---|---|
| 11,363,544 B1* | 6/2022 | Rohit Kumar | G10L 25/21 |
| 2021/0239847 A1* | 8/2021 | Sayem | H01Q 5/35 |
| 2022/0224729 A1* | 7/2022 | Im | H04L 65/80 |
| 2022/0351747 A1* | 11/2022 | Jansson | G06N 20/00 |

* cited by examiner

*Primary Examiner* — Tanmay K Shah
(74) *Attorney, Agent, or Firm* — FOLEY & LARDNER LLP (57) ABSTRACT

Systems, methods, and computer readable medium for determining connection metrics for devices in paired mode include a first device that receives metrics of a first cellular connection maintained by the second device. The first device may determine a difference between the metrics of the first cellular connection and metrics of a second cellular connection maintained by the first device. The first device may modify one or more criteria of the first device for establishing a next cellular connection, according to the difference.

20 Claims, 5 Drawing Sheets

SYSTEMS AND METHODS FOR DETERMINING CONNECTION METRICS FOR DEVICES IN PAIRED MODE

FIELD OF DISCLOSURE

The present disclosure is generally related to wireless communication, including but not limited to systems and methods of using connection metrics between devices connected to each other.

BACKGROUND

Various devices may leverage or otherwise use cellular antennas or devices for connectivity. Wearable devices, such as smart watches, head wearable devices, and the like typically have smaller form-factors and smaller antennas as compared to larger form-factor devices, such as smartphones. As such, wearable devices may have lower connection performance or cellular connection quality as compared to smartphones.

SUMMARY

Systems, methods, and computer readable medium for determining connection metrics for devices in paired mode include a first device that is paired with a second device, that can receive metrics of a first cellular connection maintained by the second device. The first device may determine a difference between the metrics of the first cellular connection, and metrics of a second cellular connection maintained by the first device. The first device may modify one or more criteria of the first device for establishing a next cellular connection, according to the difference.

In some embodiments, receiving the metrics includes receiving, by the first device, the metrics of the first cellular connection via a non-cellular connection between the first device and the second device. In some embodiments, the metrics include a timestamp, an identifier of a cell on which the first cellular connection is established, a frequency of the first cellular connection, and/or at least one of a received signal strength indicator (RSSI), a reference signal received power (RSRP), a reference signal received quality (RSRQ), or a signal-to-noise ratio (SNR) corresponding to the first cellular connection. In some embodiments, the first deice may determine that the second device is switching from the first cellular connection to a non-cellular connection. The first device may disable an antenna of the first device, that is configured for cellular communication.

In some embodiments, the metrics identify a quality of the first cellular connection on a frequency (or frequency band) or an identifier of a cell corresponding to the first cellular connection. The first device may exclude the frequency (or frequency band) or the identifier of the cell corresponding to the first cellular connection, from a scanning criteria for identifying the next cellular connection. In some embodiments, the first cellular connection is with a first cell, and the second cellular connection is with a second cell. The first device may switch from the second cell to the first cell for the next cellular connection, according to the difference. In some embodiments, the first cellular connection is with a first cell, and the second cellular connection is with a second cell. The first device may establish the next cellular connection on a third cell different from the first cell and the second cell, according to the difference.

In some embodiments, the first device may store the metrics of the first cellular connection in one or more data structures accessible by the first device. The first device may compare the metrics of the first cellular connection from or stored in the one or more data structures, to the metrics of the second cellular connection. In some embodiments, the first device may identify the metrics of the first cellular connection from a plurality of metrics stored in the one or more data structures. The first device may identify the metrics according to an access location for the first cellular connection matching an access location for the second cellular connection, a frequency for the first cellular connection matching a frequency for the second cellular connection, and a timestamp corresponding to the metrics of the first cellular connection. The first device may additionally or alternatively identify the metrics according to a cell and a frequency for the first cellular connection matching a cell and a frequency for the second cellular connection. In some embodiments, the first device includes a wearable device and the second device includes a smartphone.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to systems and methods for determining connection metrics of devices in paired mode (e.g., devices connected to each other via Bluetooth™ or other connection). More specifically, this disclosure relates to systems and methods for estimating radio frequency antenna losses for wearable devices for example, in a paired mode with a smartphone (or other larger form-factor) device for instance. Wearable devices, such as smart watches, head wearable devices, and the like typically have smaller form-factors and smaller antennas as compared to smartphones. This results in smaller antenna gain and thus a difference in downlink signal strength. Where a smartphone experiences low but acceptable quality/performance for cellular links or connections, the wearable device (having a smaller form-factor) may experience unacceptable performance loss.

According to the systems and methods described herein, a smartphone may periodically or at certain times (e.g., according to a defined event or trigger) send (and correspondingly the wearable device may receive) metrics of the cellular connection of the smartphone. The metrics may include, for instance, a timestamp, cell identifier (ID) and/or frequency (e.g., frequency band), along with cellular metrics of the cellular connection (e.g., received signal strength indicator [RSSI], reference signal received power [RSRP], reference signal received quality [RSRQ], signal-to-noise ratio [SNR], etc.) to the wearable device. The smartphone may send the metrics to the wearable device via a non-cellular connection, such as a Bluetooth link between the devices. The wearable device may store the timestamp, cell ID, frequency and metrics in a data structure (e.g., memory or other storage device). The wearable device may determine an offset (e.g., difference, disparity measure) between metrics of cellular connections between the wearable device and the corresponding cell, and received metrics of the smartphone and the smartphone's corresponding cell. The offset can be determined based on the timestamps (e.g., the devices accessed the same network or access point at the same frequency at approximately the same time), and/or based on the frequencies and cells matching.

The wearable device may use the offset to modify various scanning and selection criteria for establishing cellular connections. For example, if the smartphone reports poor metrics on a specific cell or frequency, the wearable device may bar the frequency (e.g., as being an out-of-service frequency) from scanning for acceptable frequency/cell. As another example, the wearable device may apply the determined offset to determine whether or not to switch to a different cell or frequency (e.g., if the smartphone reports metrics which are low/poor but still acceptable performance, the wearable device may determine not to switch to that cell or frequency, according to the offset to the metrics). Additionally, where a smartphone moves outside of LTE (or some other cellular network) due to bad connection metrics, the wearable device may automatically determine to disable the cellular antenna of the wearable device (e.g., assuming that it is not feasible for the wearable device to switch to the cellular network of the smartphone, or to maintain any present cellular connection of the wearable device with another network or cell due to unfavorable conditions).

According to the systems and methods described herein, by modifying the scanning and selection criteria for establishing cellular connections, devices may conserve power. For example, by avoiding particular cells or frequencies which have known poor metrics (e.g., based on sharing of metrics between the devices), a device may skip, forego, or otherwise omit scanning for particular frequencies or cells, thereby reducing power of the device consumed through scanning for such frequencies. Additionally or alternatively, by modifying the scanning and selection criteria, the devices may have improved key performance indicators (KPIs) relating to such cellular connections. For example, by avoiding some cells or frequencies or prioritizing other cells or frequencies according to the metrics shared between the devices, the device may establish connections on frequencies to cells having better overall performance metrics, thereby resulting in fewer dropped calls, shorter mean setup delays, better throughput or goodput, and so forth. Various other improvements and advantages of the systems and methods described herein are discussed below.

Figure 1:
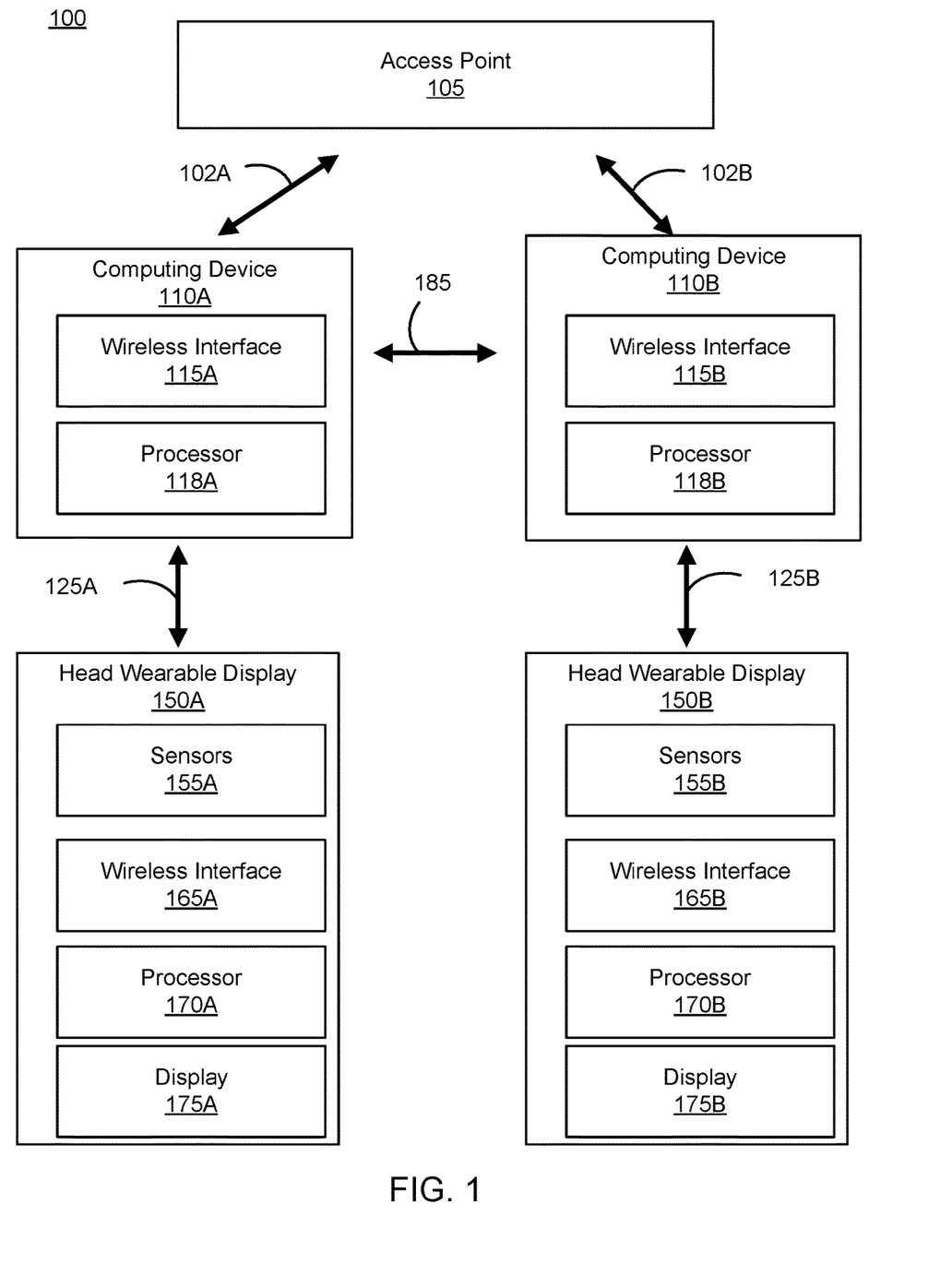
FIG. 1 is a diagram of a system environment including an artificial reality system, according to an example implementation of the present disclosure.
Figure 2:
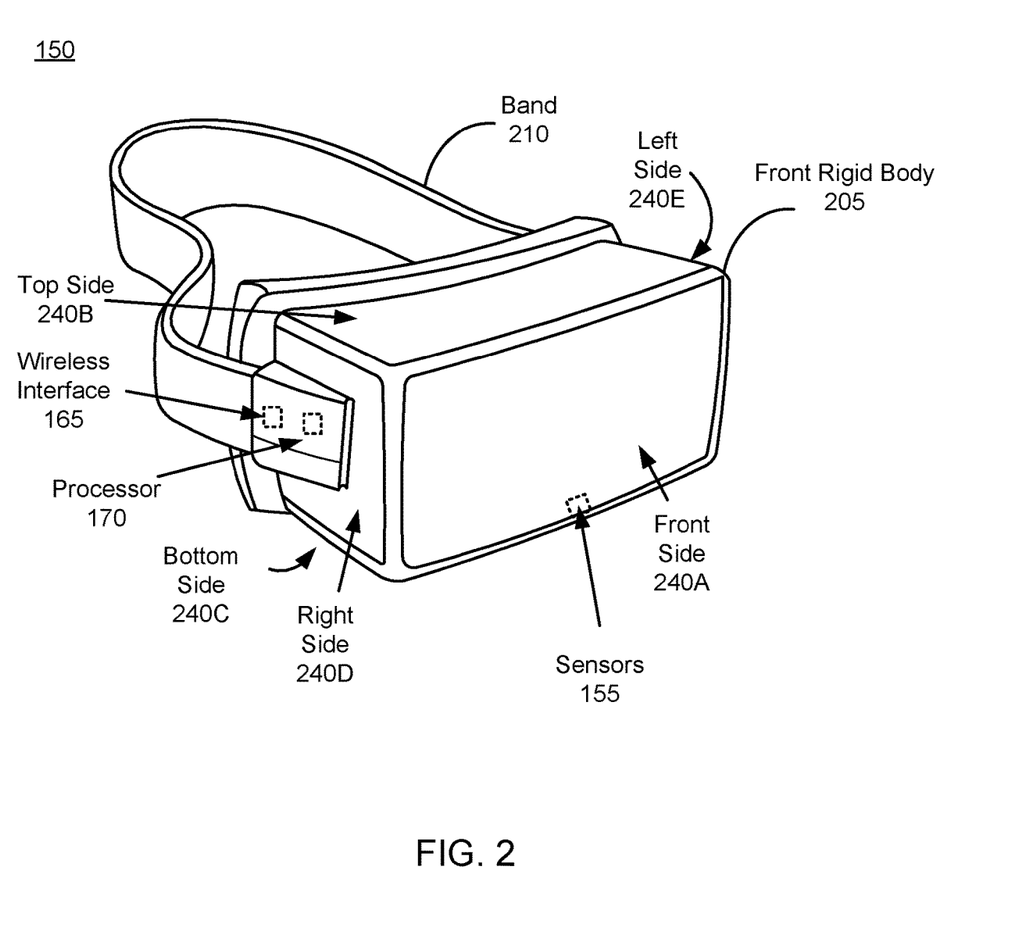
FIG. 2 is a diagram of a head wearable display, according to an example implementation of the present disclosure.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as consoles) providing data for artificial reality to the one or more HWDs 150. The access point 105 may comprise one or more base stations, routers or any other network devices allowing one or more computing devices 110 and/or one or more HWDs 150 to access a network (e.g., the Internet, cellular network(s), WLAN network(s)). The access point 105 may be replaced by any one or more communication device (e.g., cell base stations). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110. For example and in some embodiments, the computing device 110 and the HWD 150 are in a single device, or the HWD 150 may directly communicate with the access point 105.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Figure 3:
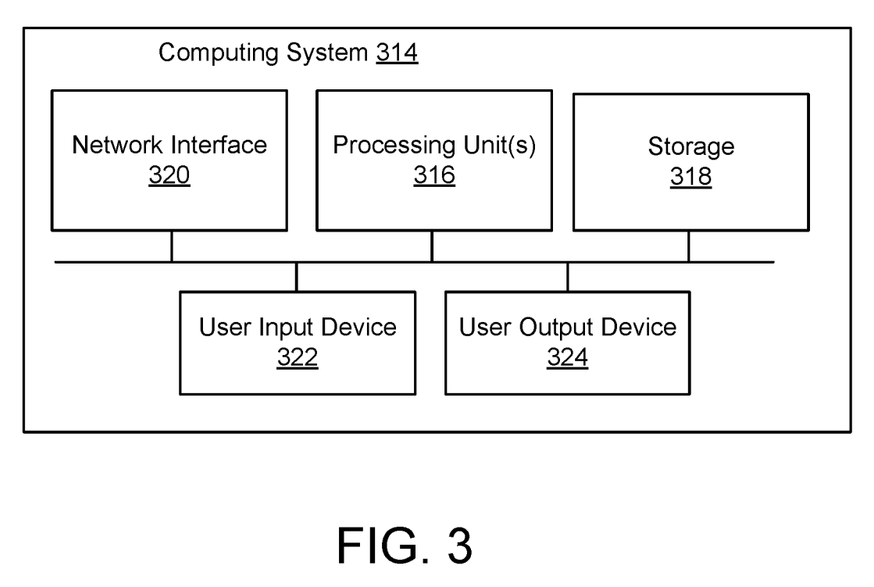
FIG. 3 is a block diagram of a computing environment, according to an example implementation of the present disclosure.

Various operations described herein can be implemented on computer systems. FIG. 3 shows a block diagram of a representative computing system 314 usable to implement the present disclosure. In some embodiments, the computing device 110, the HWD 150, devices 402, 404, or each of the components describe above with reference to FIGS. 1-2 and FIGS. 4-5 are implemented by or may otherwise include one or more components of the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

The following description is directed to systems and methods for determining and/or using connection metrics of devices in paired mode (e.g., devices having at least one connection between the devices, which can include a peer-to-peer connection, or having one device operate as a soft access point for the other device). More specifically, this disclosure relates to systems and methods for estimating radio frequency antenna losses for wearable devices (or small form factor devices) in a paired mode with a smartphone (or other larger form-factor) device. Wearable devices, such as smart watches, head wearable devices, and the like typically have smaller form-factors and/or smaller or limited-capability antennas as compared to smartphones for instance. This results in smaller antenna gain and thus a difference in received downlink signal strength. Where a smartphone experiences low but acceptable quality/performance for cellular links or connections, the wearable device (by having a smaller form-factor) may experience unacceptable performance loss.

According to the systems and methods described herein, a smartphone may periodically send (and correspondingly the wearable device may receive) metrics of the cellular connection of the smartphone. The metrics (e.g., parameters, measurements, information, characteristics, identifiers) may include, for instance, a timestamp, cell identifier (ID) and/or frequency, along with cellular metrics of the cellular connection (e.g., received signal strength indicator [RSSI], reference signal received power [RSRP], reference signal received quality [RSRQ], signal-to-noise ratio [SNR], etc.) to the wearable device. The smartphone may send the metrics to the wearable device via a non-cellular (or out-of-band) connection, such as a Bluetooth™ link between the devices. The wearable device may store (e.g., cache, log) the timestamp, cell ID, frequency and/or metrics in a data structure (e.g., memory, log, database). The wearable device may determine an offset between metrics of cellular connections between the wearable device and the cell of the wearable device, and received metrics of the smartphone and the cell of the smartphone. The offset can be determined based on the timestamps (e.g., the devices accessed the network/cell(s) and/or at the same frequency (e.g., frequency band) at approximately the same time), and/or based on the frequencies and cells matching. The wearable device may use the offset to modify various scanning and selection criteria for establishing cellular connections. For example, if the smartphone reports poor metrics on a specific cell or frequency, the wearable device may bar the frequency from scanning for an acceptable frequency/cell, to conserve scanning power. As another example, the wearable device may apply/consider the determined offset to determine whether or not to switch to a different cell or frequency (e.g., if the smartphone reports metrics which are low but acceptable performance, the wearable device may determine not to switch to that cell or frequency by considering/applying the offset to the metrics in determining whether the offset metrics corresponds to acceptable performance). Additionally, where a smartphone moves outside of LTE (or some other cellular network) due to bad connection metrics, the wearable device may automatically determine to disable the cellular antenna of the wearable device (e.g., since the wearable device is not expected to connect to the cellular network/cell of the smartphone).

Figure 4:
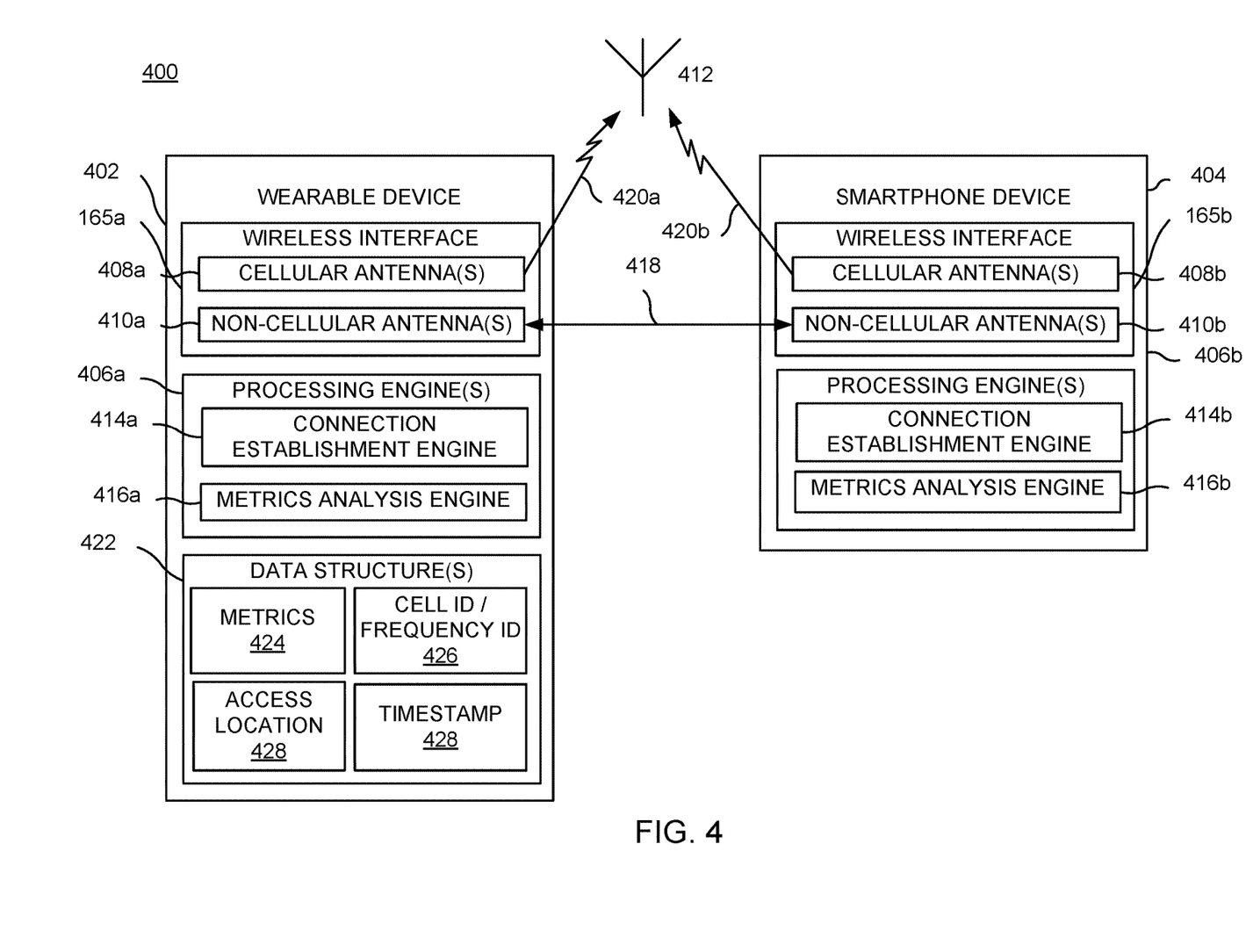
FIG. 4 is a block diagram of a system for using connection metrics of devices in paired mode, according to an example implementation of the present disclosure.

Referring now to FIG. 4, depicted is a block diagram of a system 400 for determining and/or using connection metrics for devices in paired mode, according to an example implementation of the present disclosure. As shown in FIG. 4, the system 400 may include a wearable device 402 and a paired device (e.g., a smartphone device 404 by way of illustration). The wearable device 402 and smartphone device 404 may each include a wireless interface 165, which may be similar to the wireless interface 165 described above with reference to FIG. 1-FIG. 3. The wireless interfaces 165a, 165b may each include cellular antenna(s) 408 and non-cellular antenna(s) 410. The devices 402, 404 may be configured to establish respective cellular connections (e.g., via the cellular antennas 408) to a cellular base station 412 (e.g., on a particular cell and frequency for the base station 412 or cell site), and a non-cellular connection between the devices 402, 404 (e.g., via the non-cellular antenna(s) 410). As described in greater detail below, the wearable device 402 may be configured to receive metrics of the cellular connection maintained by the smartphone device 404. The wearable device 402 may be configured to determine a difference between the metrics of the cellular connection maintained by the smartphone device 404 and the cellular connection maintained by the wearable device 402. The wearable device 402 may be configured to modify one or more criteria for establishing a subsequent cellular connection for the wearable device 402 according to the difference.

While described herein as wearable devices 402 and smartphone devices 404, it is noted that the systems and methods described herein may be used by, adapted for, other otherwise implemented in other devices or components. For example, the systems and methods described herein may be implemented in various combinations of devices, such as portable devices and personal computers or routers that can provide connection metrics for network connections. Therefore, the present disclosure is not limited to the use case of wearable devices 402 and smartphone devices 404 described herein.

The wireless interface 165a, 165b (generally referred to as "wireless interface 165") is shown to include cellular antenna(s) 408a, 408b (generally referred to as "cellular antenna(s) 408") and non-cellular antenna(s) 410a, 410b (generally referred to as "non-cellular antenna(s) 410"). The cellular antenna(s) 408 may be or include one or more antennas tuned, designed, or otherwise configured to establish cellular connections with the base station 412 (e.g., on a given cell and frequency bands for the base station(s) 412). The cellular antenna(s) 408 may be configured to establish cellular connections in the 700 MHz band (e.g., 698-806 MHz), 800 MHz band (806-849/851-896 MHz), PCS Band (1850-1910/1930-1990 MHz), AWS band (e.g., 1710-1755/2110-2155 MHz), or any other cellular frequency band that may be used to establish cellular connections. The non-cellular antenna(s) 410 may be or include one or more antennas tuned, designed, or otherwise configured to establish non-cellular (or out-of-band) connections between the device 402, 404 and another device. In some embodiments, the non-cellular antenna(s) 410 may be or include Bluetooth™ antenna(s) 410 configured to operate in Bluetooth™ frequencies. In some embodiments, the non-cellular antenna(s) 410 may be or include Wi-Fi antenna(s) 410 configured to operate in Wi-Fi/WLAN frequencies. In some embodiments, the non-cellular antenna(s) 410 may be or include near-field communication (NFC) or ultra-wideband (UWB) antenna(s) 410 configured to operate in NFC or UWB frequencies.

The wearable device 402 and smartphone device 404 may include one or more processing engines 406. The processing engine(s) 406 may include a connection establishment engine 414a, 414b (generally referred to as "connection establishment engine 414") and a metrics analysis engine 416a, 416b (generally referred to as "metrics analysis engine 416"). The processing engine(s) 402 may be or include any device, component, element, circuitry, processor(s) or hardware (e.g., to execute software) configured to perform various operations of the devices 402, 404 as described herein.

The connection establishment engines 414 may be configured to establish a non-cellular connection 418 between the devices 402, 404. In some embodiments, the connection establishment engine 414 may be configured to establish the non-cellular connection responsive to or as part of the devices 402, 404 being paired. For example, a user of the devices 402, 404 may be configured to pair the devices 402, 404 by initiating a device search and pairing (e.g., connection negotiation/establishment) function on one of the respective devices (such as the smartphone device 404) for the other device (such as the wearable device 402). When the search function is initiated, the connection establishment engine 414 may be configured to cause the non-cellular antenna(s) 410a, 410b to broadcast, transmit, or otherwise output signals indicating a device name or identifier and their availability to be paired. Continuing this example, the user may select the wearable device 402 (e.g., an identifier or device name for the wearable device 402) displayed on a user interface of the smartphone device 404. Once the wearable device 402 is selected, the devices 402, 404 may be configured to exchange (e.g., via the non-cellular antenna(s) 410a, 410b) one or more data packets (such as handshake data packets), to pair the devices 402, 404. When the devices 402, 404 are paired, the devices 402, 404 may be configured to establish, generate, or otherwise maintain the non-cellular connection 418 between the devices 402, 404 using the respective non-cellular antenna(s) 410.

The connection establishment engine 414a of the wearable device 402 may be configured to establish a cellular connection 420a between the wearable device 402 and the base station 412 (or cell site, cell tower, etc.). The connection establishment engine 414a may be configured to initiate establishment of the cellular connection 420a responsive to the wearable device 402 being turned on, responsive to the cellular antenna 408 being enabled, etc. The connection establishment engine 414a may be configured to initiate establishment of the cellular connection 420a by performing a scan for nearby base stations 412 (or cells). The base stations 412 may be configured to periodically transmit or broadcast signals on various frequencies for nearby devices (e.g., within range of the base stations 412). In some instances, the cellular antenna(s) 408 may receive signals from multiple base stations 412, though in other instances the cellular antenna(s) 408 may receive one or more signals from a single base station 412 (e.g., within range). As described in greater detail below, the connection establishment engine 414a may be configured to establish the cellular connection 420a using one or more criteria applied to various metrics of the signal(s) received from the base station 412 (such as signal strength, quality, integrity or power).

The connection establishment engine 414b of the smartphone device 404 may be configured to establish a cellular connection 420b between the smartphone device 404 and a base station 412 (also referred to as "cell 412" or "cellular base station 412"). The connection establishment engine 414b may be configured to establish the cellular connection 420b in a manner similar to the connection establishment engine 414a described above. In some instances, such as where the devices 402, 404 are located in close proximity, the devices 402, 404 may be configured to establish cellular connections 420a, 420b to the same cell or base station 412 and on the same frequency. However, in various instances and implementations, the devices 402, 404 may be configured to establish cellular connections 420a, 420b to different cells and/or base stations 412 and/or on different frequencies (e.g., to the same cell/base station 412).

The metrics analysis engine 414 may be configured to measure, identify, detect, quantify, or otherwise determine metrics of the cellular connection 420 between the device 402, 404 and the base station 412. The metrics analysis engine 414 may be configured to determine the metrics responsive to one or more defined times/events/triggers, and/or responsive to establishment of the cellular connection 420. The metrics may include, for example, a received signal strength indicator (RSSI), a reference signal received power (RSRP), a reference signal received quality (RSRQ), error rate (e.g., block error rate (BLER)), and/or a signal-to-noise ratio (SNR) corresponding to the cellular connection 420. In some embodiments, the metrics analysis engine 414 may be configured to determine the metrics based on packets or data communicated between the device 402, 404 and the base station 412. For example, the metrics analysis engine 414 may be configured to determine the metrics based on data communicated from the device 402, 404 via the cellular antenna(s) 408 to the base station 412 and/or responses from the base station 412 received via the cellular antenna(s) 408 by the devices 402, 404. The metrics analysis engine 414 may be configured to compute the metrics based on a power of signals received from the base station 412, based on detected interference from other signals with respect to the signals received from the base station 412, and so forth. The metrics analysis engine 416 may be configured to determine the metrics of the cellular connections 420 at various intervals (e.g., every second, every five seconds, every 10 seconds, every 30 seconds, every minute, etc.).

The metrics analysis engine 416b of the smartphone device 404 may be configured to create, construct, produce, or otherwise generate a metrics packet for transmission to the wearable device 402. The metrics packet may include, for example, an identifier of the base station 412 or cell to which the smartphone device 404 is connected, a frequency of the cellular connection 420b, a timestamp corresponding to when metrics were determined for the cellular connection 420b, and/or the metrics determined by the metrics analysis engine 416b (e.g., the RSSI, RSRP, RSRQ, SNR, etc.) for the cellular connection 420b. In some embodiments, the metrics packet may include a location (e.g., an access location) of the smartphone device 404 when the smartphone device 404 captured, measured, or otherwise obtained the metrics. For example, the metrics analysis engine 416b may be configured detect, determine, or otherwise identify a geolocation of the smartphone device 404 when the smartphone device 404 obtained the metrics. The metrics analysis engine 416b may be configured to identify the geolocation using one or more sensors of the smartphone device 404, such as a global positioning system (GPS) device or sensor of the smartphone device 404. The metrics analysis engine 416b may be configured to incorporate the geolocation in the metrics packet as the access location. The metrics analysis engine 416b may be configured to generate the metrics packet at various intervals (e.g., at the same interval in which the metrics are measured/determined, or less frequently than when the metrics are measured/determined), and/or in response to one or more defined triggers/events/ conditions. The metrics analysis engine 416b may be configured to transmit, send, or otherwise provide the metrics packet to the wearable device 402. In some embodiments, the metrics analysis engine 416b may be configured to transmit the metrics packet via the non-cellular connection 418 (e.g., using the non-cellular antenna(s) 410b) to the wearable device 402.

The metrics analysis engine 416a may be configured to receive metrics of the cellular connection 420b maintained by the smartphone device 404. The metrics analysis engine 416a may be configured to receive the metrics in the metrics packet received from the smartphone device 404. In some embodiments, the metrics analysis engine 416 may be configured to receive the metrics via the non-cellular connection 418 (e.g., via the non-cellular antenna(s) 410a) from the smartphone device 404. The metrics analysis engine 416a may be configured to receive the metrics at various intervals (e.g., at the intervals in which the metrics analysis engine 416b of the smartphone device 404 sends the metrics packet to the wearable device 402). In some embodiments, the metrics analysis engine 416 may be configured to receive the metrics on-demand. For example, the metrics analysis engine 416a may be configured to transmit a request (e.g., via the non-cellular antenna(s) 410a) on the non-cellular connection 418 to the smartphone device 404 to obtain the metrics. The metrics analysis engine 416b may be configured to collect, identify, or otherwise obtain the metrics (e.g., in real-time or from the most recent measurement), and respond to the request with the metrics packet.

The wearable device 402 may include, maintain, or otherwise access one or more data structure(s) 422 (e.g., data log, record, database, memory). While shown as being located on the wearable device 402, in some implementations, the data structure(s) 422 may be located remote from the wearable device 402 and can be accessed via the wireless interface 165a. The data structure(s) 422 may be configured to store, maintain, or otherwise include data relating to metrics of cellular connections 420a, 420b. In some embodiments, the metrics analysis engine 416a may be configured to update, revise, or otherwise incorporate metrics into the data structure(s) 422. The metrics analysis engine 416a may be configured to incorporate metrics of the cellular connection 420a maintained by the wearable device 402 in the data structure(s) 422. The metrics analysis engine 416a may be configured to incorporate metrics of the cellular connection 420b maintained by the smartphone device 404 (e.g., and received from the smartphone device 404) in the data structure(s) 422. As shown in FIG. 4, the metrics analysis engine 416a may be configured to populate the data structure(s) 422 to include the metrics 424, along with a cell identifier and/or an identifier of the base station 412 to which the cellular connection 420a, 420b is connected, a frequency identifier corresponding to a frequency e.g., band/channel) of the cellular connection 420a, 420b (collectively shown as cell and frequency ID 426), and/or an access location 428, and/or a timestamp 428 corresponding to a location (e.g., geolocation) and time in which the metrics 424 were collected and/or obtained by the metrics analysis engine 416a.

The metrics analysis engine 416a may be configured to compare metrics for the cellular connection 420a with metrics of the cellular connection 420b maintained by the smartphone device 404. In some embodiments, the metrics analysis engine 416a may be configured to identify metrics 424 from the data structure(s) 422 related to the connection 420a maintained by the wearable device 402. In some embodiments, the metrics analysis engine 416a may be configured to identify the metrics 424 by applying one or more filtering or match rules to the data included in the data structure(s) 422.

In some embodiments, the metrics analysis engine 416a may be configured to apply a first filter based on the cell, base station and/or frequency identifier(s). For example, the metrics analysis engine 416a may be configured to apply a filter to the metrics 424 in the data structure 422 using the cell, base station and/or frequency identifier(s) of the first cellular connection 420a. The metrics analysis engine 416a may be configured to select one or more sets of metrics 424 from the data structure(s) 422 responsive to identifying a match of the cell, base station and/or frequency identifier(s) of the first cellular connection 420a to the cell, base station and/or frequency identifier(s) 426 from the data structure(s) 422 (e.g., indicating that the wearable device 402 and smartphone device 404 were accessing the same cell or same base station 412 or the same frequency). Where multiple sets of metrics 424 are identified, the metrics analysis engine 416a may be configured to select the most recent metrics 424 according to the timestamp 428.

In some embodiments, the metrics analysis engine 416a may be configured to apply a second filter based on access location. In some embodiments, the metrics analysis engine 416a may be configured to apply the second filter responsive to not identifying any matched metrics 424 when the first filter was applied. The metrics analysis engine 416a may be configured to compare a location of the wearable device 402 (e.g., using data from a GPS sensor of the wearable device 402) to access locations 428 corresponding to the metrics 424 in the data structure(s) 422. The metrics analysis engine 416a may be configured to identify a first subset of metrics 424 which are linked or otherwise associated with an access location 428 which matches or substantially matches the location of the wearable device 402 (e.g., indicating that the smartphone device 404 was located in close proximity to the location of the wearable device 402 when the metrics 424 were obtained). The metrics analysis engine 416a may be configured to identify a further subset of metrics 424 (e.g., from the first subset) based on the frequency used to access a particular cell or base station 412. For example, the metrics analysis engine 416a may be configured to identify the second subset of metrics 424 which are linked or otherwise associated with a frequency identifier 426 which matches the frequency of the first cellular connection 420a (e.g., indicating that the smartphone device 404 was operating on the same frequency as the wearable device 402 when the metrics 424 were obtained). The metrics analysis engine 416a may be configured to select a set of metrics 424 from the second subset according to the timestamp 428. For instance, the metrics analysis engine 416a may be configured to select the set of metrics 424 from the second subset based on which of the timestamps 428 of the second subset is most recent.

The metrics analysis engine 416a may be configured to compare the set of metrics 424 identified (e.g., responsive to applying the first and/or second filter) from the data structure(s) 422 to the metrics corresponding to the first cellular connection 420a. The metrics analysis engine 416a may be configured to compare the metrics 424 to compute, identify, calculate, or otherwise determine a difference or offset (e.g., an offset measure/statistic/metric) of the metrics of the cellular connections 420a, 420b. For example, the metrics analysis engine 416a may be configured to determine a difference or offset between the RSSI, RSRP, RSRQ, and/or SNR of the first cellular connection 420a of the wearable device 402 to the RSSI, RSRP, RSRQ, and/or SNR/BLER of the second cellular connection 420b of the smartphone device 404. The metrics analysis engine 416a may be configured to communicate, send, share, or otherwise provide the difference or offset in metrics to the connection establishment engine 414a.

The connection establishment engine 414a may be configured to receive or identify the difference or offset in metrics determined by the metrics analysis engine 416a. The connection establishment engine 414a may be configured to use the difference to modify criteria for establishing subsequent/next/other cellular connection(s) of the wearable device 402. As described briefly above, the connection establishment engine 414a may be configured to apply various criteria for establishing cellular connection(s). In some instances, the criteria may be based on metrics (e.g., signal power, signal strength, etc.) of signals received from the base station 412 or cell. In some embodiments, the criteria may be based on the difference or offset in metrics determined by the metrics analysis engine 416a.

In some embodiments, the connection establishment engine 414a may be configured to apply one or more criteria responsive to identifying a set of metrics 424 from applying the first filter (e.g., cell and frequency identifiers matching). The connection establishment engine 414a may be configured to determine whether the difference satisfies a threshold criteria. For example, the connection establishment engine 414a may be configured to determine whether a difference between the RSSI (or RSRP, RSRQ, SNR, etc.) of the second cellular connection 420b and RSSI (or RSRP, RSRQ, SNR, etc.) of the first cellular connection 420a is greater than a threshold (or that the quality/strength/integrity [e.g., RSSI, RSRP, RSRQ, SNR] of the first cellular connection 420a is below that of the second cellular connection 420b by the threshold). The connection establishment engine 414a may be configured to remove, reject, omit, or otherwise exclude the cell, base station and/or frequency identifier(s) 426 responsive to the difference not satisfying the threshold criteria. For example, where the connection establishment engine 414 receives (e.g., via the cellular antenna(s) 408a) a signal from the cell 412, the connection establishment engine 414 may be configured to remove, reject, omit, or otherwise exclude the cell 412 and/or frequency from list of available cells/frequencies. In some implementations, the connection establishment engine 414a may be configured to exclude the particular frequency, but may permit, allow, or otherwise include the cell 412 as an available cell 412 for establishing the cellular connection 420a. In this regard, the connection establishment engine 414a may be configured to establish a subsequent cellular connection 420a with the same cell 412, though on a different frequency.

In some embodiments, the connection establishment engine 414a may be configured to apply one or more criteria responsive to identifying a set of metrics 424 from applying the second filter. For example, the second filter may cause the metrics analysis engine 416a to identify metrics which relate to cellular connections 420 to different cells 412, but measured at similar locations and times and on the same or similar frequencies. The connection establishment engine 414a may be configured to determine whether to switch to the cell 412 of the second connection 420b responsive to applying the criteria to the difference. For example, where the difference indicates that the second cellular connection 420b has metrics which are greater or more favorable (e.g., higher SNR, higher RSSI, RSRP, RSRQ) relative to the first cellular connection 420a, the connection establishment engine 414a may be configured to determine to establish a subsequent cellular connection 420a with the cell 412 of the second connection 420b (as opposed to the cell 412 of the first cellular connection 420a or a different cell). As another example, where the difference indicates that the second cellular connection 420b has metrics which are lower or less favorable (e.g., weaker SNR, lower RSSI, RSRP, RSRQ) relative to the first cellular connection 420a, the connection establishment engine 414a may be configured to determine to establish a subsequent/next cellular connection 420a with a different cell 412 than the cell 412 of the first cellular connection 420a and the cell 412 of the second cellular connection 420b.

In some embodiments, the connection establishment engine 414a may be configured to selectively enable and/or disable the cellular antenna(s) 408a. The connection establishment engine 414a may be configured to selectively enable or disable the cellular antenna(s) 408a based on data received from the smartphone device 404. For example, the connection establishment engine 414b may be configured to determine to switch to a non-cellular connection (e.g., a Wi-Fi connection), or determine that the smartphone device 404 is out of (e.g., cellular) service, responsive to the connection establishment engine 414b not identifying a suitable or good cellular connection 420b. The smartphone device 404 may be configured to transmit data to the wearable device 402 indicating that the smartphone device is switching from a cellular connection 420 to a non-cellular connection. The connection establishment engine 414a may be configured to receive the data from the smartphone device 404 indicating that the smartphone device 404 is switching to a non-cellular connection. The connection establishment engine 414a may be configured to disable the cellular antenna(s) 408 of the wearable device 402 based on the data. The connection establishment engine 414a may be configured to re-enable-ra-activate the cellular antenna(s) 408 at a subsequent point in time (e.g., after expiration of a duration, responsive to receiving subsequent data indicating that the smartphone device 404 is switching back to a cellular connection 420, etc.).

Figure 5:
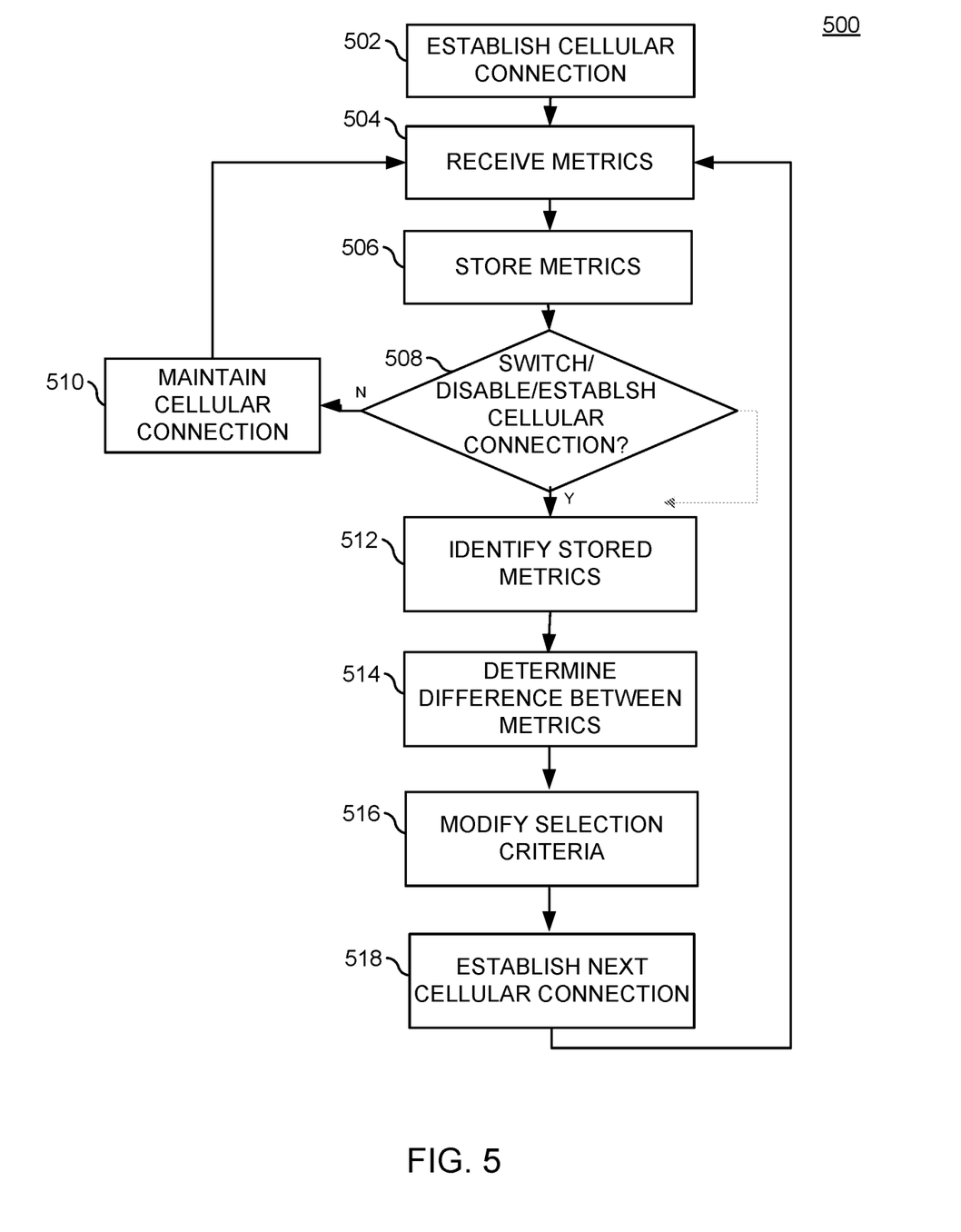
FIG. 5 is a flow diagram of a method for using connection metrics of devices, according to an example implementation of the present disclosure.

Referring now to FIG. 5, depicted is a flowchart showing a method 500 for determining and/using connection metrics for devices in paired mode, according to an example implementation of the present disclosure. The method 500 may be performed or implemented by the devices, components, or elements described above with reference to FIG. 1-FIG. 4. As a brief overview, at step 502, a first device may establish a cellular connection. At step 504, the first device may receive metrics. At step 506, the first device may store the metrics. At step 508, the first device may determine whether to switch or disable the cellular connection. At step 510, the first device may maintain the cellular connection. At step 512, the first device may identify stored metrics. At step 514, the first device may determine a difference between metrics. At step 514, the first device may modify a selection criteria. At step 516, the first device may establish the next cellular connection.

At step 502, a first device may establish a cellular connection. In some embodiments, the first device may establish a first cellular connection between the first device and a cell or base station. The first device may establish the first cellular connection responsive to the first device being powered on. The first device may establish the first cellular connection responsive to a cellular antenna of the first device being enabled. The first device may establish the first cellular connection responsive to receiving/detecting cell signals from one or more cells and on one or more frequencies. The first device may establish the first cellular connection based on the cell signal(s) received from the one or more cells. Where the first device receives multiple cell signals from different cells and/or on different frequencies, the first device may select a cell signal based on metrics of the cell signal (e.g., a signal strength, power, etc.) as compared to other cell signals. The first device may establish the cellular connection by transmitting one or more data packets to authenticate access to the cellular network, to the cell which transmitted the cell signal selected.

The first device may establish a connection with a second device. In some embodiments, the first device may establish a non-cellular connection (such as a Bluetooth™ connection) with the second device. The first device may establish the connection with the second device responsive to or in connection with the first and second devices being paired (e.g., according to a pairing procedure performed between the devices as described above). The first device may establish the connection with the second device responsive to the devices being within a signaling range of each other (e.g., being within a Bluetooth™ range or other non-cellular range). In some embodiments, the first device may be a wearable device and the second device may be a smartphone device.

At step 504, the first device may receive metrics. In some embodiments, the first device may receive metrics of a cellular connection (e.g., a second cellular connection) maintained by the second device. The first device may receive the metrics from the second device responsive to the first and second devices being paired. In some embodiments, the first device may receive the metrics of the second cellular device on the non-connection between the first and second devices. The first device may receive, and the second device may send, the metrics at various intervals. For example, the second device may send the metrics periodically and/or according to one or more triggers/events/times/conditions, responsive to establishing a new cellular connection, etc. The first device may receive the metrics from the second device in one or more data packets (e.g., a metrics data packet). The metrics packet may include, for instance, a timestamp, an identifier of a cell on which the cellular connection of the second device is established, a frequency of the cellular connection, and/or the metrics of the cellular connection. The metrics may include, for instance, a received signal strength indicator (RSSI), a reference signal received power (RSRP), a reference signal received quality (RSRQ), and/or a signal-to-noise ratio (SNR) corresponding to the cellular connection of the second device. The first device may also measure the same and/or similar metrics (e.g., RSSI, RSRP, RSRQ, SNR, etc.) of the cellular connection maintained by the first device.

At step 506, the first device may store the metrics. In some embodiments, the first device may store the metrics of the cellular connection maintained by the second device in one or more data structures accessible by the first device. The first device may store the metrics responsive to receiving the metrics from the second device. In some embodiments, as new metrics are received from the second device, the first device may update the data structure(s) to include the new metrics. In some embodiments, the first device may purge, delete, or otherwise remove metrics from the data structure(s). For example, the first device may remove metrics from the data structures after an expiration period, to remove stale metrics.

At step 508, the first device may determine whether to switch or disable the cellular connection, or to establish a new/next cellular connection. The first device may determine whether to switch the cellular connection from the first cellular connection (e.g., established at step 502) to a new cellular connection. The first device may determine whether to switch the cellular connection to a new cellular connection based on metrics of the first cellular connection identified, determined, or otherwise measured by the first device. For example, if the metrics indicate that a connection quality of the first cellular connection is below a threshold (e.g., RSSI is below a threshold, RSRP/RSRQ/SNR is below a threshold, etc.), the first device may determine to switch to a new cellular connection. In some embodiments, the first device may determine to disable the cellular connection. For example, the first device may receive, from the second device, data indicating that the second device is switching from a cellular connection to a non-cellular connection. The first device may receive the data from the second device in a manner similar to receiving the metrics as described above with reference to step 504. The first device may determine, based on the data received from the second device, that the second device is switching from the cellular connection to a non-cellular connection. The first device may disable the cellular connection responsive to determining that the second device is switching from the cellular connection to the non-cellular connection. In some embodiments, the first device may disable the cellular connection by disabling a cellular antenna of the first device. In other words, and in some implementations, the first device may disable an antenna of the first device which is configured for cellular connection based on determining that the second device is switching to a non-cellular connection.

Where, at step 508, the first device determines not to disable or switch the cellular connection (e.g., because metrics of the cellular connection do not satisfy/meet a switching/disabling criteria) and/or determines not to establish a new/next cellular connection, at step 510 the first device may maintain a/any cellular connection established at step 502. The method 500 may loop back to step 504, where the first device receives subsequent metrics of the second connection and/or where the device measures metrics of the first cellular connection. Where the device determines to switch the cellular connection to a new cellular connection, the method 500 may proceed to step 512. In some embodiments, where the device determines to establish a new/next cellular connection, the method 500 can proceed to step 512.

At step 512, the first device may identify stored metrics. In some embodiments, the first device may identify metrics for the second device from the metrics stored at step 506. In some embodiments, the first device may identify the metrics responsive to determining to switch to a different cellular connection, or to establish a new/next cellular connection. The first device may identify the metrics of the cellular connection maintained by the second device from a plurality of metrics stored in the data structure(s). In some embodiments, the first device may identify the metrics from the data structure(s) by applying one or more filters to the data in the data structure(s). In some embodiments, the first device may identify the metrics based on an access location, frequency, and timestamp. For example, the first device may identify the metrics based on an access location for the first cellular connection (e.g., of the first device) matching an access location for the second cellular connection (e.g., of the second device) and/or a frequency for the first cellular connection matching a frequency for the second cellular connection. Where the first device identifies several sets of metrics from the data structure(s) which satisfy the first filter (e.g., based on access location and/or frequency), the first device may select the metrics from the sets based on the timestamp (e.g., which timestamp is most recent or proximate to a current time). In some embodiments, the first device may identify the metrics based on a frequency and/or cell of the first cellular connection. For example, the first device may identify a cell identifier corresponding to the cell to which the first cellular connection is established, a base station id, and/or a frequency of the first cellular connection. The first device may apply a filter to the data structure(s) using the cell identifier, base station and/or frequency of the first cellular connection, to identify any metrics which are stored in the data structure(s) that relate to a connection that was to the same cell and/or on the same frequency.

At step 514, the first device may determine a difference between metrics. In some embodiments, the first device may determine a difference between the metrics of the first cellular connection (e.g., maintained by the first device) and metrics of the second cellular connection maintained by the second device. The first device may determine the difference between metrics computed, determined, or otherwise identified by the first device for the first cellular connection, and metrics determined by the second device for the second cellular connection and identified from the data structure(s). The first device may compare the metrics for the first and second cellular connections to determine the difference. The first device may determine a difference between, for instance, the RSSI, RSRP, RSRQ, SNR, etc. of the first connection maintained by the first device, and the RSSI, RSRP, RSRQ, SNR, etc. of the second connection identified from the data structure(s).

At step 514, the first device may modify a selection criteria. In some embodiments, the first device may update, revise, or otherwise modify one or more criteria of the first device for establishing another cellular connection according to the difference determined at step 512. The first device may maintain, include, or otherwise use one or more selection criteria for selecting, determining, or otherwise identifying a cell, base station, and frequency to use for establishing a cellular connection. For example, the selection criteria may include criteria relating to cells, base stations and/or frequencies to avoid or exclude, cells and/or frequencies to switch to or prioritize, etc. The first device may modify the selection criteria used to establish the next cellular connection based on the difference between the metrics.

In some embodiments, where the metrics identify a quality of the second cellular connection on a frequency base station and/or an identifier of a cell corresponding to the second cellular connection is below a threshold, the first device may exclude the frequency or cell identifier from a scanning criteria for identifying the next cellular connection. In this regard, where the first device receives or otherwise identifies a cell signal from a cell which is excluded, the first device may ignore, disregard, or otherwise not establish a cellular connection to that cell. In some implementations, the first device may exclude the frequency but not the cell identifier corresponding to the cell. In this regard, where the first device receives a cell signal from the cell on a different frequency, the first device may establish a cellular connection with the cell on the different frequency.

In some embodiments, where the first and second devices have cellular connections to different cells or base stations, the first device may determine whether to switch to (or establish a new connection with) the other cell (e.g., of the second device) or to a third cell based on the difference. For example, where the difference shows that the second connection of the second device to a second cell has metrics which are better (e.g., higher SNR, stronger RSSI, RSRP, RSRQ, etc.) than the metrics of the first connection to a first cell, the first device may determine to switch from the first cell to the second cell for the next/new/subsequent cellular connection, according to the difference. As another example, where the difference shows that the second connection of the second device to a second cell has metrics which are worse (e.g., lower SNR, lower RSSI, RSRP, RSRQ, etc.) than the metrics of the first connection to a first cell, the device may determine to establish a connection to a third cell based on the difference. For instance, the first device may exclude the first and second cells from the search criteria, according to the difference.

At step 516, the first device may establish the next cellular connection. In some embodiments, the first device may establish the next cellular connection between the first device and a cell, according to the modified selection criteria. The first device may establish the next cellular connection by initiating a search for cell signals received from one or more cells. The first device may apply the search criteria, responsive to initiating the search, to cell identifiers and/or frequencies of received cell signals. The first device may ignore, disregard, or otherwise exclude one or more cell signals according to the selection criteria. The first device may establish the next cellular connection responsive to applying the selection criteria. The first device may establish the next cellular connection by sending one or more packets or data to the cell which sent the selected cell signal, to authenticate access to the cellular network, and responsive to one or more components relating to the cellular network authenticating the data from the first device.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
receiving, by a first device that is paired with a second device, metrics of a first cellular connection maintained by the second device;
determining, by the first device, a difference between the metrics of the first cellular connection, and metrics of a second cellular connection maintained by the first device; and
modifying, by the first device, one or more criteria of the first device for establishing a next cellular connection, according to the difference.

2. The method of claim 1, wherein receiving the metrics comprises receiving, by the first device, the metrics of the first cellular connection via a non-cellular connection between the first device and the second device.

3. The method of claim 1, wherein the metrics comprise a timestamp, an identifier of a cell on which the first cellular connection is established, a frequency of the first cellular connection, and at least one of a received signal strength indicator (RSSI), a reference signal received power (RSRP), a reference signal received quality (RSRQ), or a signal-to-noise ratio (SNR) corresponding to the first cellular connection.

4. The method of claim 1, comprising:
determining, by the first device, that the second device is switching from the first cellular connection to a non-cellular connection; and
disabling, by the first device, an antenna of the first device, that is configured for cellular communication.

5. The method of claim 1, wherein the metrics identify a quality of the first cellular connection on a frequency band or an identifier of a cell corresponding to the first cellular connection, and wherein modifying the one or more criteria of the first device for establishing the next cellular connection comprises:
excluding, by the first device, the frequency band or the identifier of the cell corresponding to the first cellular connection, from a scanning criteria for identifying the next cellular connection.

6. The method of claim 1, wherein the first cellular connection is with a first cell, and wherein the second cellular connection is with a second cell, and wherein modifying the one or more criteria of the first device for establishing the next cellular connection comprises:
switching, by the first device, from the second cell to the first cell for the next cellular connection, according to the difference.

7. The method of claim 1, wherein the first cellular connection is with a first cell, and wherein the second cellular connection is with a second cell, and wherein modifying the one or more criteria of the first device for establishing the next cellular connection comprises:
establishing, by the first device, the next cellular connection on a third cell different from the first cell and the second cell, according to the difference.

8. The method of claim 1, further comprising:
storing, by the first device, the metrics of the first cellular connection in one or more data structures accessible by the first device; and
comparing, by the first device, the metrics of the first cellular connection stored in or from the one or more data structures, to the metrics of the second cellular connection.

9. The method of claim 8, further comprising:
identifying, by the first device, the metrics of the first cellular connection from a plurality of metrics stored in the one or more data structures, according to at least one of:
a) an access location for the first cellular connection matching an access location for the second cellular connection, a frequency for the first cellular connection matching a frequency for the second cellular connection, and a timestamp corresponding to the metrics of the first cellular connection; or
b) a cell and a frequency for the first cellular connection matching a cell and a frequency for the second cellular connection.

10. The method of claim 1, wherein the first device comprises a wearable device and the second device comprises a smartphone.

11. A first device that is paired with a second device, the first device comprising:
one or more processors configured to:
receive metrics of a first cellular connection maintained by the second device;
determine a difference between the metrics of the first cellular connection, and metrics of a second cellular connection maintained by the first device; and
modify one or more criteria of the first device for establishing a next cellular connection, according to the difference.

12. The first device of claim 11, wherein the one or more processors are configured to receive the metrics of the first cellular connection via a non-cellular connection between the first device and the second device.

13. The first device of claim 11, wherein the metrics comprise a timestamp, an identifier of a cell on which the first cellular connection is established, a frequency of the first cellular connection, and at least one of a received signal strength indicator (RSSI), a reference signal received power (RSRP), a reference signal received quality (RSRQ), or a signal-to-noise ratio (SNR) corresponding to the first cellular connection.

14. The first device of claim 11, wherein the one or more processors are configured to:
determine that the second device is switching from the first cellular connection to a non-cellular connection; and
disable an antenna of the first device, that is configured for cellular communication.

15. The first device of claim 11, wherein the metrics identify a quality of the first cellular connection on a frequency band or an identifier of a cell corresponding to the first cellular connection, and wherein to modify the one or more criteria of the first device for establishing the next cellular connection, the one or more processors are configured to:
   exclude the frequency band or the identifier of a cell corresponding to the first cellular connection, from a scanning criteria for identifying the next cellular connection.

16. The first device of claim 11, wherein the first cellular connection is with a first cell, and wherein the second cellular connection is with a second cell, and wherein to modify the one or more criteria of the first device for establishing the next cellular connection, the one or more processors are configured to:
   switch from the second cell to the first cell for the next cellular connection, according to the difference.

17. The first device of claim 11, wherein the first cellular connection is with a first cell, and wherein the second cellular connection is with a second cell, and wherein to modify the one or more criteria of the first device for establishing the next cellular connection, the one or more processors are configured to:
   establish the next cellular connection on a third cell different from the first cell and the second cell, according to the difference.

18. The first device of claim 11, wherein the one or more processors are configured to:
   Store the metrics of the first cellular connection in one or more data structures accessible by the first device; and
   compare the metrics of the first cellular connection from or stored in the one or more data structures, to the metrics of the second cellular connection.

19. The first device of claim 18, wherein the one or more processors are configured to:
   identify the metrics of the first cellular connection from a plurality of metrics stored in the one or more data structures, according to at least one of:
   a) an access point for the first cellular connection matching an access point for the second cellular connection, a frequency for the first cellular connection matching a frequency for the second cellular connection, and a timestamp corresponding to the metrics of the first cellular connection; or
   b) a cell and a frequency for the first cellular connection matching a cell and a frequency for the second cellular connection.

20. A non-transitory computer readable medium storing instructions that, when executed by one or more processors of a first device that is paired with a second device, cause the one or more processors to:
   receive metrics of a first cellular connection maintained by the second device;
   determine a difference between the metrics of the first cellular connection, and metrics of a second cellular connection maintained by the first device; and
   modify one or more criteria of the first device for establishing a next cellular connection, according to the difference.

\* \* \* \* \*